United States Patent [19]

Murray

[11] 4,413,277

[45] Nov. 1, 1983

[54] INSTANT REPLAY PRODUCTIVITY MOTIVATION SYSTEM

[75] Inventor: John M. Murray, Monroeville, Ala.

[73] Assignee: Instant Replay Systems, Evergreen, Ala.

[21] Appl. No.: 227,600

[22] Filed: Jan. 23, 1981

[51] Int. Cl.³ .............................................. H04N 7/18
[52] U.S. Cl. ..................................... 358/93; 358/101; 358/183; 358/903; 364/402
[58] Field of Search ................. 358/93, 101, 183, 903; 364/402

[56] References Cited

U.S. PATENT DOCUMENTS 3,278,680 10/1966 Hummel .............................. 358/183
3,983,474 9/1976 Kuipers ............................ 324/43 R

OTHER PUBLICATIONS

*Mini–Micro Systems*, Nov. 1980, pp. 153–162, "Applying Automatic Speech-Recognition to Data Entry", Rothberg.
Scott Instruments, VET/2 Voice Entry Terminal Operators Manual, Apr. 1, 1981–Version 2.1.
*IEEE Transactions on Aerospace and Electronic Systems*, vol. AES-15, No. 5, Sep. 1979, pp. 709–718, "Magnetic Position Tracking and Orientation System".

*Primary Examiner*—Howard Britton
*Attorney, Agent, or Firm*—Burns, Doane, Swecker & Mathis

[57] ABSTRACT

A real time, instant replay time-motion analysis system of work measurement that utilizes computer assisted video techniques to simultaneously record and display an operator at work and the elapsed time for the performance of each elemental step in his work task. An observer provides an input signal each time a step is completed and a subsequent step initiated, thereby causing the display of elapsed time relating to the first step to freeze and a display indicating running time for the second step to be generated. Input relating to interruptions occurring during the work process are manually and audibly provided to the system by the observer. The time related data generated during the study is calculated in a microprocessor, and presented as graphical illustrations on the video monitor during replay of the recorded information.

19 Claims, 8 Drawing Figures

INSTANT REPLAY PRODUCTIVITY MOTIVATION SYSTEM

BACKGROUND OF THE INVENTION

The present invention relates to the field of industrial engineering, and more specifically, to the particular facet of that field dealing with the time-motion analysis of work functions in which an operator performs the same task, comprising one or more manipulative steps, over a substantial period of time.

In the past, a typical time-motion analysis, or time study, was carried out almost totally manually by the industrial engineer. After initial preparation for the study, in which the engineer determined the particular motions he was going to measure, he would undertake the study, during which he would stand at the operator's shoulder, or some other place from which he could conveniently observe the operator's work motion, to measure with a stopwatch the amount of time each step in the operator's performance took and record the measurements on a chart. For example, if the engineer is conducting a time study of an operator who is sewing pockets on shirts, he might record the time it took the operator to carry out each of the steps of picking up a pocket and shirt to be sewn, aligning the pocket in the proper location on the shirt, stitching each of the various edges of the pocket, and disposing of the finished shirt. Once the engineer had measured a number of operations over a particular length of time, e.g., one hour, the engineer would then return to his office where he would calculate the results of the measurements he had just taken. Typically, the calculation would require at least another hour of the engineer's time, and could take as much as three to four hours. Once the engineer had calculated the results of the study, and obtained the data he needed for analysis, he could return to discuss the results of the study with the operator, or present them to management for their use.

One of the major difficulties faced by an industrial engineer is the effective communication of the results of his study to the operator whom he has observed. Usually the time study will result in a substantial amount of data consisting mainly of numbers indicating, for example, the average time it took the operator to complete work on each garment, the average time it took for each step in the work process, the operator's best and worst times for each step, and the operator's expected output over the course of a week, month, or year based upon the measurements taken during the study. Often, a numerical feedback of this sort does not have much meaning for the operator, who is not trained in the analysis of statistical data and cannot use such data to pinpoint areas for improvement.

Another problem that is faced by the industrial engineer relates to the credibility that the operator is willing to give to the results obtained by the engineer. For example, as a result of his study, the engineer might determine that the operator's time for a particular step is longer than the standard time based on an average of all observed workers. He further might suggest to the operator that if the operator were to decrease his time on this step, he would be able to process a greater number of garments per day, and thus would set the operator's daily quota at this figure. However, the operator may not be willing to accept the determinations and suggestions given by the engineer. For example, he may think that the engineer was not operating the stopwatch at the correct times and therefore is not willing to place any weight on the numbers generated as a result of the engineer's study. Furthermore, he may consider the engineer's suggestion of a production quota to be too subjective, and thus might feel that it is unfair.

Typically, once a time study is completed, the operator might ask the Engineer how his performance rated. However, due to the time required by the engineer to calculate the results of his measurements before he can present them to the operator, he cannot immediately answer the operator's question. Furthermore, by the time he does return with the results, the operator may have lost interest in the purpose of the study, or the style of the garment may have changed to such a degree that the results of the study are no longer applicable.

Thus, as a result of these difficulties faced by the industrial engineer, the final step of the time study process, the acceptance of his suggestions by the operator who has been studied, and by management, could often take up to several months because of the lack of credibility that the study is initially greeted with. It is this final phase of acceptance of the results of time-motion analysis that limits the industrial engineer's effectiveness.

More recently, developments have appeared which facilitate the industrial engineer's task of conducting time studies. One of these developments is the portable data entry terminal, which consists of one or more standard electronic timers that can be key actuated to automatically record the elapsed time for each manipulative step in the work process. By freeing the engineer from the requirements of having to manually control a plurality of stopwatches and enter the time-related data on a chart, the engineer is able to concentrate more of his time on the observation of the operator's methods, and thus is not as likely to miss the occurrence of a particular event.

While these data entry terminals are advantageous in this respect, they still do not overcome the major difficulties faced by the engineer. Specifically, they still require a specific amount of time for calculation to be undertaken by the engineer at the end of the study, either with or without the assistance of a computer, before the results of the study can be presented to the operator. Furthermore, the results of the study obtained with the time study board are the same as those from a manual time study, i.e., data consisting of numbers relating to time measurements. Thus, although the data entry terminal assists the engineer in the recording of data, it does not help to overcome the problems associated with communication and credibility.

It is therefore a general object of the present invention to provide a novel time-motion analysis system in which the results of a time study are calculated immediately at the place where the study was conducted, e.g., on the shop floor, at the end of the study. As a further feature, the calculated results are communicated to the operator in a visual and personalized manner such that the operator can readily understand the factors that are of concern to the industrial engineer, accept the results of the study, gain useful insights into self-improvement and effectively participate in the determination of his quota.

It is another object of the present invention to provide such a system in which the input and intervention by the industrial engineer is kept to a minimum while increasing the interaction between the operator and the system, to thereby increase the credibility of the evaluation and analysis of the operator's performance and provide a learner based teaching aid.

It is a further object of the present invention to utilize instant replay video techniques for the self-analysis and self-training of operators in a manner that enhances self-motivation and productivity improvement.

Video systems have been used in the past as a training tool. In these systems, a recording is made of operators performing a task for which others are to be trained. Once the recording is made, for example on video tape, it is usually edited, and further processed to provide titles, graphical data, etc. This editing and processing step usually results in the expiration of a substantial amount of time between the recording of the operators performance and its subsequent playback. Hence, this conventional type of video teaching system may have some value in the training of new operators, but generally is not useful as an analysis tool in the time study environment, because it does not operate on a real time basis.

It is therefore yet a further object of the present invention to provide a novel time-motion analysis system that operates on a real time basis and provides instantaneous feedback to the operator so that the results of the observation of his work habits will be presented to him at a time when he is most interested in it and able to appreciate its value.

It is still another object of the present invention to provide a novel time-motion analysis system that affords instantaneous random access to multiple format responses in a realtime, instant replay mode.

It is yet another object of the present invention to provide a time-motion analysis system that renders useful feedback information for people other than the operator, including the industrial engineer and quality control personnel, in a timely fashion.

BRIEF DESCRIPTION OF THE DRAWINGS

The manner in which the present invention achieves these, as well as other, objects and advantages will become apparent from the following detailed description of a preferred embodiment of the invention, when taken in conjunction with the accompanying drawings, in which.

DETAILED DESCRIPTION

The following detailed description of a preferred embodiment of the present invention is made with exemplary reference to the apparel industry, and more specifically to the analysis of an operator performing the task of sewing pockets on a shirt, where such reference is useful for the understanding of particular features of the invention. It will be appreciated by those of ordinary skill in the art, however, that the invention has general applicability to any situation in which the analysis of repetitively performed functions is to be carried out, including functions such as the soldering of electrical components onto a circuit board, and the stamping of metal pieces in a punch press, for example. The invention is also applicable to other fields in which body motions are analyzed, such as sports, dancing, and acrobatics.

SYSTEM COMPONENTS

Figure 1:
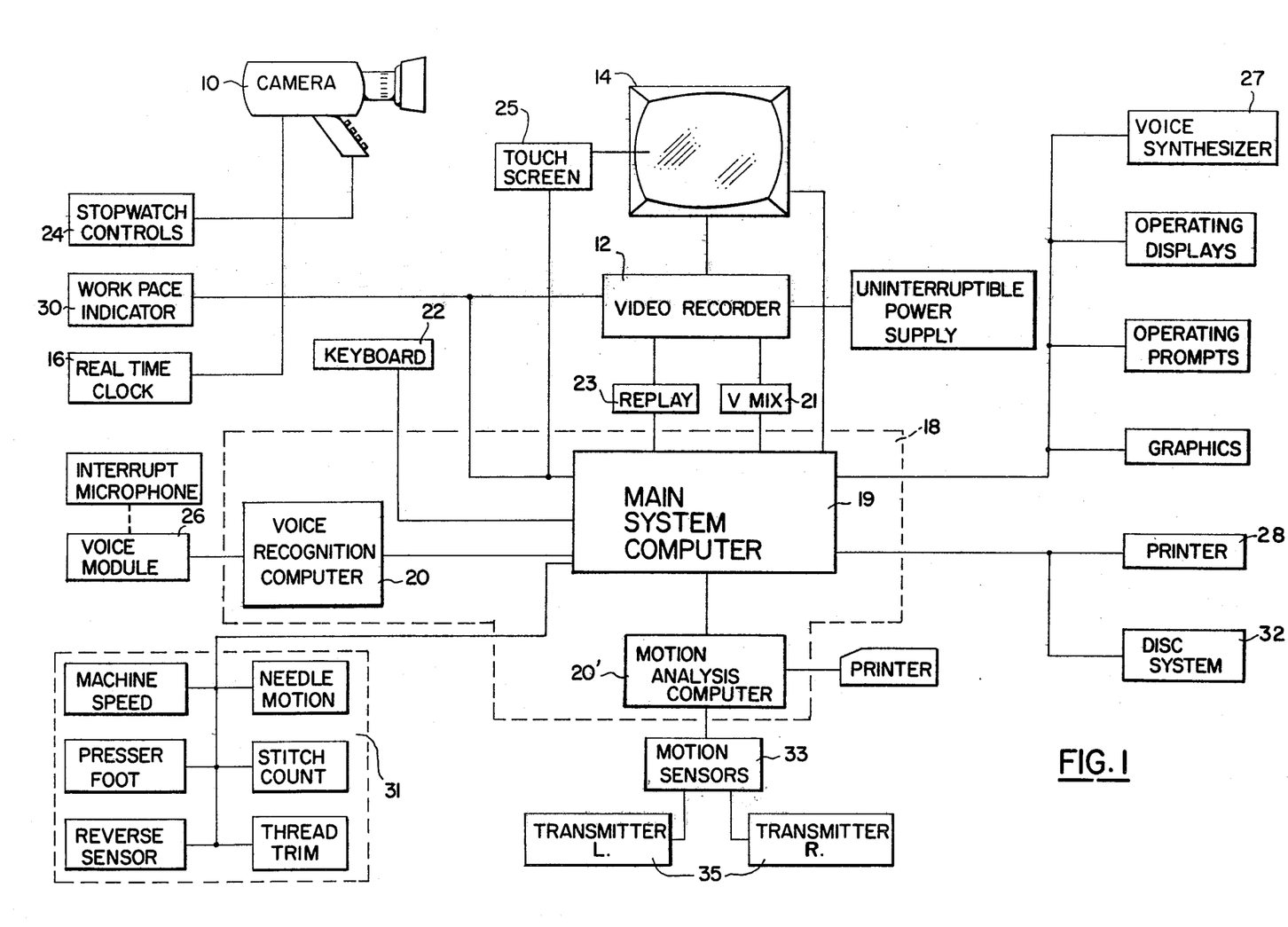
FIG. 1 is a block diagram of the major components of a preferred embodiment of a time-motion analysis system constructed in accordance with the present invention.

The basic components of a time-motion analysis system constructed in accordance with the present invention are illustrated in the block diagram of FIG. 1. The primary input channel of the video system includes a video camera 10 and video tape recorder 12 that the industrial engineer, or observer, uses during the course of his time study to visually record the motions of the operator being studied. The video tape recorder 12 is connected to a video monitor 14 that comprises the basic output element of the system.

Another input channel of the analysis system comprises a timer assembly, or real time clock, 16 that operates in conjunction with a character generator in a computer system 18. The clock 16 and the character generator can both comprise integral units of the computer system 18, that is used to control the various internal operations of the system and provide desired calculations. The computer system can be comprised of a central control computer 19 and one or more dedicated computers 20 and 20' that primarily function as interface units for processing and controlling the flow of information between the central computer 19 and various pieces of peripheral input and output equipment. The computer 19 receives real time information from the timer assembly 16 and generates one or more displays related to the real time information on the screen of the monitor 14 through a video mixer 21, as well as causes them to be recorded in the video tape recorder 12, and simultaneously within the memory of the computer system 18.

A replay module 23 includes an encoder that numbers each video picture, or field, individually, and records numbers on the video tape and in the computer memory in conjunction with the real time data of the current work element, or cycle. This information enables the computer to search and find, in a random access mode, any point in the study without rewinding the tape to the starting point.

The manual input of information by the observer or the operator into the system can be accomplished through a conventional alpha-numeric keyboard unit 22 associated with the microprocessor. However, since it may not be convenient or practical for the observer to provide information to the system through the keyboard unit 22 during the taking of the time study, a separate manual input unit comprising a limited number of switches associated with particular facets of the study, i.e., stopwatch control, is provided. If the observer conducting the study is also the person who will be operating the video camera 10, the stopwatch control switches 24 are preferably provided on the pistol grip handle of the camera for convenient access. However, if the observer is not going to be operating the camera, the stopwatch control switches 24 can be located on a separate control unit.

The system can also be provided with a touch screen input module 25 to manually enter information. In operation, control functions, for example rewind, fast forward, etc., relating to the recorder 12, are displayed on the screen of the monitor 14, and by simply touching the screen at the place where the function is displayed, the control function will be carried out. This form of input is particularly useful during interactive feedback with the operator.

In addition to having the capability for the manual input of information, the analysis system can also be provided with a voice recognition module 26 by means of which certain predetermined control words can be audibly entered into the system. A tone or voice synthesizer 27 can be provided, either as a separate unit or in combination with the voice recognition module 26, to give the system the capability of providing audible output signals.

Another input element is a pace display control unit 30. During the course of a time-motion analysis study, it is often customary for the observer to simultaneously record his evaluation of the pace at which the worker is operating. The pace display control unit 30 enables the observer to display his estimate the worker's pace on the monitor 14 and have it simultaneously recorded by the video recorder 12 and within the memory of the computer system. In its preferred form, the pace display control unit 30 comprises a slider switch that controls the position of an indicator on the screen of the monitor 14 with respect to a scale indicating units of working pace, such as percentage values, for example.

The system can also be provided with a hard copy printer 28 for providing an alpha-numeric printout of predetermined data useful for subsequent studies.

In addition to utilizing the manual and audible inputs from the observer, the analyzer system can also be provided with sensory inputs related to the elemental work steps that can be automatically sensed, such as machine implemented steps. For example, in the described embodiment relating to the sewing of pockets on shirts, one or more sensors 31 can be placed on the sewing machine to provide an indication related to the time it takes each portion of the sewing step to be completed. More specifically, sensors can be provided on the machine to indicate movement of the needle, position of the presser foot, direction of material feed through the machine, and machine speed.

As a further feature, discrete motion sensors or transponders 33 could be placed on the operator's hands or fingers, for example, and a sensory field set up by means of transmitters 35 to detect the operator's individual hand movements during performance of the various steps. The detected movements can provide input information relating to the distance, direction, time required for each movement, or delays between movements, and recorded in the computer system memory. Appropriate displays relating to the detected motions can be generated on the video monitor.

SYSTEM OPERATION-OBSERVATION

Figure 2:
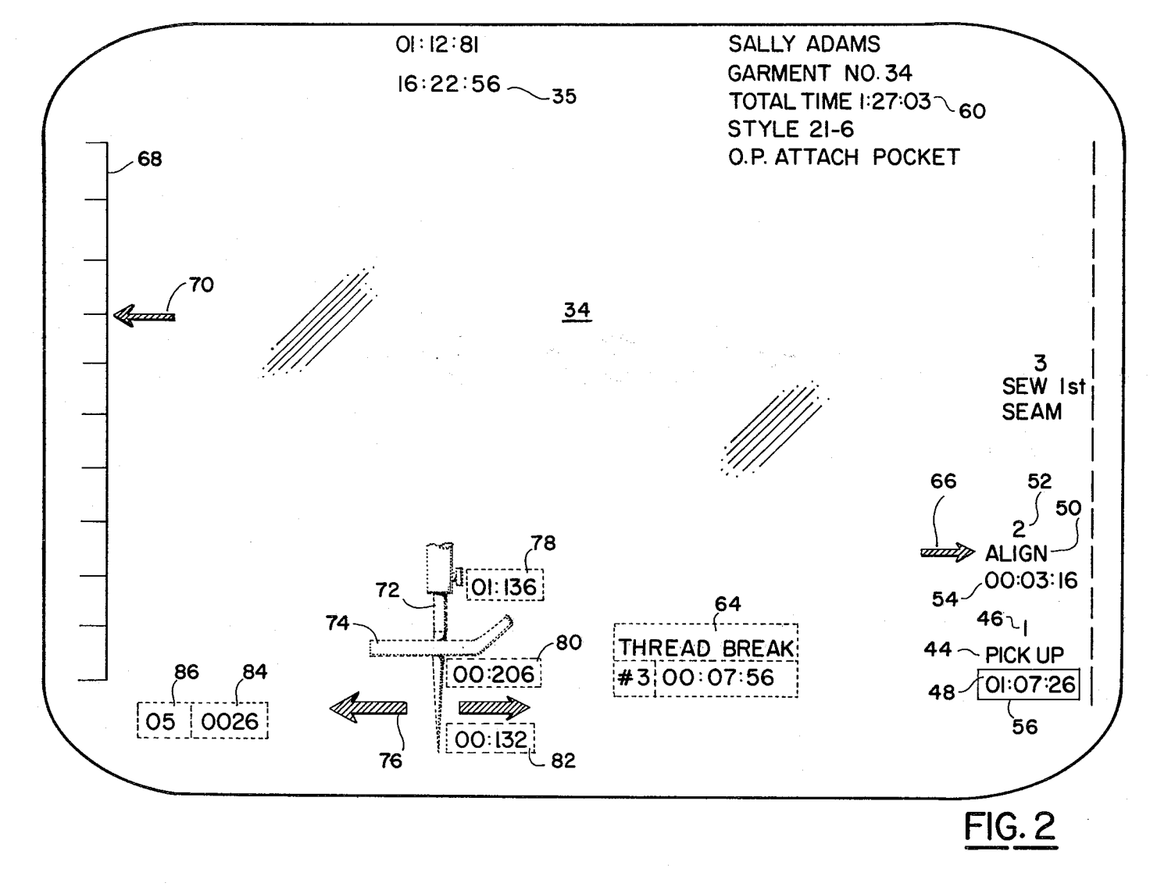
FIG. 2 is a view of a video display screen illustrating the various types of information that can be presented on the output display of the system.

The operation of the system will be described with reference to FIG. 2, which comprises an illustration of the display screen of the video monitor 14. Prior to initiation of the study, the observer loads appropriate programs into the computer system 18 along with the data necessary for the particular study to be undertaken. For example, the program information can be entered on a magnetic disk that is inserted into a disk drive and read unit 32 (FIG. 1) associated with the computer 19. The various types of information entered into the system include the names, or labels, and sequence of each of the manipulative steps to be carried out by the operator during the performance of each task. For example, if the task being studied by the observer is the sewing of a pocket onto a shirt, the various elemental steps of that task can include (1) picking up a pocket and a shirt, (2) positioning the shirt on the sewing machine and aligning the pocket on the shirt, (3) sewing the first seam on the pocket, (4) repositioning the shirt, (5) sewing the second seam on the pocket, (6) repositioning the shirt, (7) sewing the third seam on the pocket, (8) clipping the thread, and (9) disposing of the finished shirt.

In addition, the input data to the system can include a listing of the various types of interruptions that might occur during the performance of an operator's task. Examples of such types of interruption include occurrences such as the breaking of a needle or thread, wrong color fabric, the trimming of a piece of fabric, or stopping to talk to a fellow worker who passes by. If the system includes a voice recognition input module, a library of the labels associated with each of the various types of interruptions is preferably stored in that part of the system along with the necessary information relating to the observer's audible statement of each label.

Other types of data that are fed into the system prior to the initiation of the study can include programs relating to the calculation and graphical presentation of data obtained during a study.

When the study is initiated, the video camera is focused upon the operator's work station and turned on, causing a live display of the operator at work to appear on the screen 34 of the monitor 14. In addition, the timer 16 and character generator within the computer cause a display 35 of the actual time, for example in terms of hours, minutes and seconds, to appear near the edge of the screen 34. If desirable, the date and information relating to the operator and work task can be manually entered into the system by means of the microprocessor keyboard 22 and displayed along with the actual time.

As the operator initiates the performance of a task, the observer actuates one of the stopwatch control buttons 24 on the handle of the camera. The stopwatch control buttons are illustrated in detail on the handle of the camera in FIG. 3. A snapback switch 36 is actuated each time that an elemental step of the work process is completed, and hence the next elemental step begins. The cycle switch 38 is actuated by the observer when the final step of a task, e.g., the disposing of a shirt, is completed. A totalizing switch 40 is actuated whenever a predetermined number of shirts, e.g., one dozen, have been completed. An interrupt switch 42 is actuated each time an interruption, such as a thread break, occurs, to signal the interruption of the elementary step being carried out. The interrupt switch 42 is also actuated when the interruption has terminated, to thereby signal the resumption of the measurement of the elemental step previously being carried out.

Work Element Measurement

To initiate the study, the observer actuates the snapback switch 36 to indicate that the operator is beginning the performance of the first elemental step of his task. Upon the initial actuation of the snapback switch 36, a display of the label 44 of the elemental step being performed, and its sequence number 46, will be generated along one side of the screen 34. In addition, a "running time" display 48 of the elapsed time from the actuation of the snapback switch 36 wll appear adjacent the element label 44. This display can be in terms of minutes, seconds, and fractions of a second, and can begin at zero upon actuation of the switch.

As the operator completes the first step and begins the second step, e.g., the alignment and positioning of the pocket and the shirt, the observer again actuates the snapback switch 36. The second actuation of the switch causes the next label 50 and next sequence number 52 of the second elemental step of the task to be displayed on the edge of the screen, for example immediately above the display of the first element label and its running time. Similarly, a running time display 54 associated with the performance of the second step will appear on the screen adjacent the label of the step.

Simultaneously with the second actuation of the switch 36 and the generation of the display associated with the second elemental step, the time display 48 of the first step freezes, to thereby provide an indication of the amount of time it took for that step to be performed. The indication of the elapsed time for that step preferably remains displayed on the screen 34 for a predetermined time period, e.g., two seconds after the completion of the step, so it can be seen later during playback.

In order to be able to readily discern between a running time display and a stopped time display, the stopped time display is preferably different color, or a negative of the rolling time display. For example, if the rolling time display 48 of the first element appears as black digits on a white background, then the actuation of the snapback switch 36 to freeze that time display and to cause the second time display 54 to be initiated would also cause a black box 56 to be generated adjacent the first element label 44, and the elapsed time for the performance of the first elemental step would appear within the box 56 as white digits.

The operation of the system continues in this fashion, with the observer actuating the snapback switch upon the initiation of each step in the task to thereby cause a new display associated with the new step to be generated and the running time display of the previous step to freeze. In addition, the actuation of the snapback switch can provide a signal to cause the elapsed time for the completed step to be printed by the printer 28 and stored at an appropriate address in a memory unit 58 (FIG. 1) associated with the microprocessor 20.

Upon completion of the last elemental step of the task, e.g., disposal of a shirt, the observer actuates the cycle switch 38. A signal from the switch 38 causes the element label 44 and sequence number 46, as well as the running time display 48, of the first elemental step to again be generated, and freezes the time display associated with a last elemental step of the just-completed task. In addition, actuation of the switch 38 can cause a display 60 of the total time it took to carry out the task, i.e., the sum of the individual elemental times plus any interruptions, to appear at the top of the screen. This information also is printed out by the printer 28 and recorded in the memory unit 58. In addition, the end of cycle signal from the switch 38 can cause the voice synthesizer in the voice recognition module 26, if so equipped, to audibly announce the completion of the cycle or beginning of a new one, e.g., "Garment No. 34".

If the completion of the task is also the end of a particular number of tasks, e.g., the processing of all of the shirts in a batch, the observer can actuate the totalizer switch 40 rather than the cycle switch 38. The signal from the totalizer switch causes all of the same functions to be formed as that from the cycle switch, and in addition, generates another display (not shown) indicating that total time that it took to process all of the shirts in the bundle.

Figure 3:
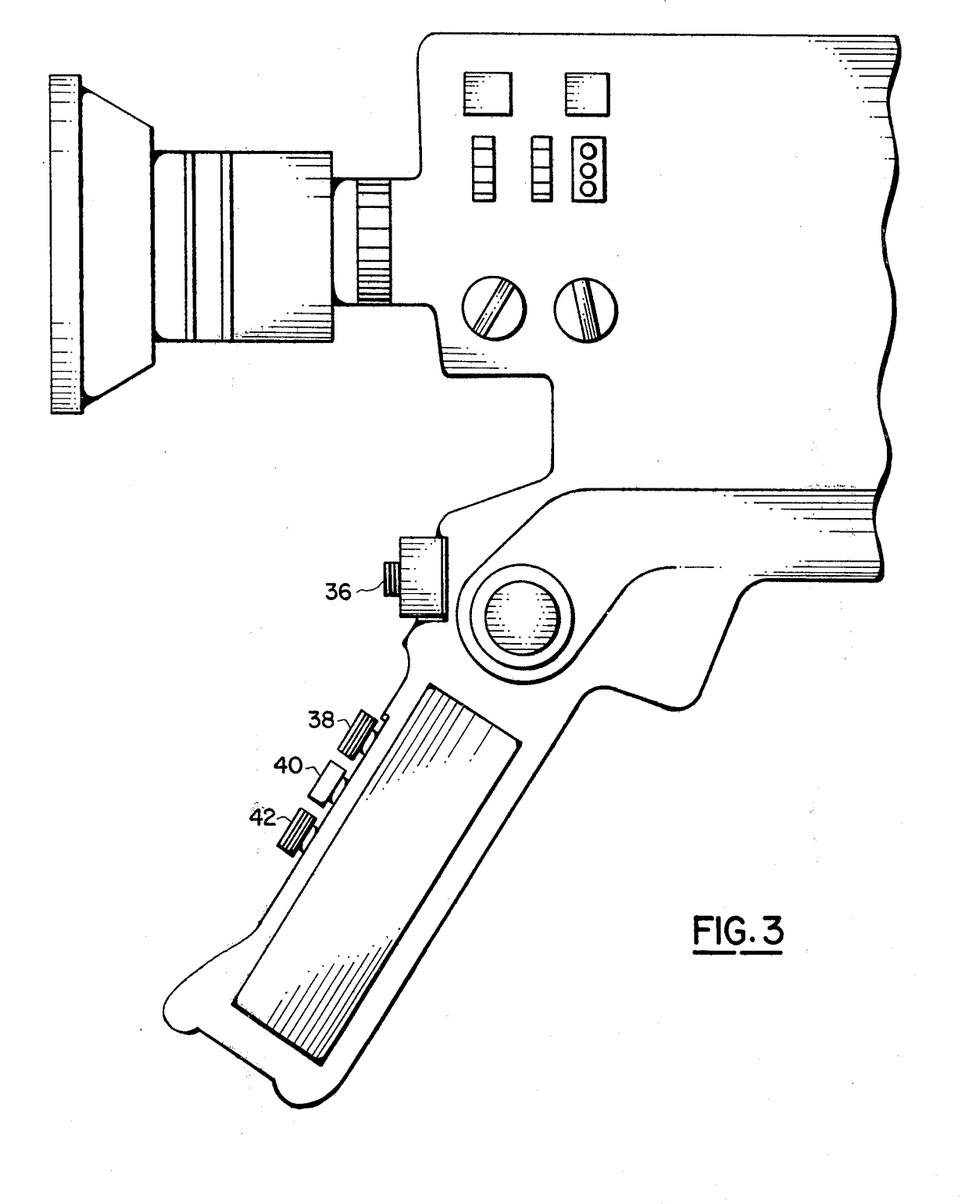
FIG. 3 is a detailed view of the video camera illustrating the switches that can be used to manually provide input signals to the system.

Alternatively, the cycle switch 38, totalizer switch 40, or both can be eliminated and the computer can automatically carry out the functions of these switches upon actuation of the snapback switch 36 after completion of the last elemental step, since it is programmed with the information relating to number of steps in a cycle, number of shirts in a bundle, etc.

Interruption

When an interruption, delay, or other event out of the normal work method occurs during a study, the observer actuates the interrupt switch 42 on the hand control unit. Actuation of this switch causes the running display of the time thus far elapsed on the regular element being performed to be stopped, causes a display 64 associated with the interrupt event to appear on the screen, and starts the timing of the interrupt element. Immediately after the interrupt switch is actuated, the observer announces the label for the interrupt element to identify it to the microprocessor by means of the voice recognition module 26. Upon recognition of the interrupt label, the label is generated adjacent the rolling time display for the interruption. In addition, the voice synthesizer is actuated to speak the name of the label as a form of feedback to the observer so that he will know that the proper label has been recognized by the computer. The observer's voice is also fed into the video tape recorder soundtrack so that it can be heard and played back from the recording. The number of times that this particular interruption has occurred during the course of the cycle, batch, or study can also be displayed adjacent the running time.

The actuation of the interrupt switch also causes an indicator 66 to be displayed adjacent the elemental work step that was being timed, to serve as a reminder to the observer that he must again press the interrupt switch a second time at the end of the interruption in order to resume the timing of the regular work element. If desired, the indicator can be made to flash, or the actual display of the element label, sequence number and time can flash, in order to provide a more noticeable indication.

Once the interruption has terminated, the interrupt switch 42 is again actuated to stop the running of the time in the interruption display 64 and resume the timing of the elemental work step that was previously being measured. The display of the interruption time and its label preferably remains on the screen for a predetermined time period, e.g., two seconds, unless another interruption occurs, which will automatically cause the first interruption display to disappear. The label and the time for the interruption, along with the number of the garment and the sequence number of the elemental work step within which it occurred, are preferably stored in the microprocessor memory.

When the observer notices slight variations in method during an element that are too fleeting to be timed, it is still desirable to label them, even though they are not timed separately as an interruption. In these cases the observer merely speaks the appropriate label word without pressing the interrupt switch. This action displays the word on the screen for two seconds, and also records it in the computer in association with that element of work. The frequency or "count" is also displayed and recorded.

Work Pace

As mentioned previously, the observer makes a personal evaluation of the operator's working pace during the course of the study. In accordance with the present invention, a vertical scale 68 appears on the left margin of the screen. The scale is graduated in suitable units associated with work pace, e.g., percentage values. A cursor arrow 70 appears adjacent the screen and indicates the observer's current (or most recent) estimate of the operator's working pace. The hand-held pace display control unit 30 enables the observer to vary the position of the cursor or the scale as his estimate of the working pace changes. In order to insure that the observer's evaluation of the working pace is kept current, the cursor can be caused to flash whenever 15 seconds have elapsed since the observer last varied the pace rating. Furthermore, if 60 seconds elapse since the last input of information on the pace display control unit 30, the voice synthesizer can be actuated to speak the word "pace" as a means of prompting input from the observer. The pace display control unit 30 is peferably provided with an acknowledge switch to enable the observer to indicate that he estimates the operator to be continuing to work at the same pace, and thereby reset the timer for the flashing cursor and the voice synthesizer prompt indicators. In addition, the cursor 70 can be caused to start flashing each time an interruption occurs, to thereby prompt the observer to note any changes in the operator's working pace that may be caused by the interruption.

The pace scale 68 that appears on the screen is preferably graduated in steps appropriate to the particular work task being studied. Furthermore, the total scale may be divided into a series of scales, only one of which is displayed on the screen at any time. For example, a scale having a total range of 50% to 200% can be divided into three scales of 50-100%, 100-150%, and 150-200%. These scales can be overlapping, if desired. Only one of the scales would appear on the screen, and as the cursor approaches the end of that scale, the display would be caused to automatically change over to the adjacent scale, and the position of the cursor adjusted correspondingly. As a means of providing a useful form of feedback to the observer and the operator, each of the various scale breakdowns can be color coded, for example, white for a low pace range, green for a middle range, and red for a fast range. Thus, if the operator is initially working at a relatively low rate less than 100%, a white scale would appear on the monitor screen. However, as he increases working pace to be greater than 100%, the indication of the scale would change from white to green, thereby providing a readily discernible and useful indication.

Sensor Inputs

Pictorial illustrations corresponding to each of the automatically sensed operations of the machine can be placed on the video monitor screen 34. For example, a picture of a needle 72 can be produced on the screen whenever the needle of the sewing machine is not moving. As soon as the operator starts the needle in motion, the illustration of the needle 72 on the screen will disappear to provide an indication that the machine is in operation. Similarly, a picture of a presser foot 74 can be produced on the screen each time that the presser foot is in the raised position, and disappear when the operator lowers it into contact with the material for machine operation. Arrows 76 can be produced on the screen to illustrate the direction of material feed through the machine during operation.

Delay Time Displays

In addition to the graphical representations of various machine operations, suitable displays of elapsed time between the various sensed operations can also be produced on the screen. For example, an indication of the time delay between the lowering of the presser foot and the initiation of sewing, i.e., the time difference between the disappearance of the indication of the presser foot 74 and the disappearance of the needle 72, can be produced. As soon as the operator lowers the presser foot, thereby causing the indicator 74 to disappear from the screen, the elapsed time indicator will appear and begin to run, and freeze as soon as needle operation begins and the indicator 72 disappears from the screen. The frozen indication of delay time can remain on the screen for a suitable time period. Likewise, similarly operating displays 80 and 82 for indicating the delay time between the stoppage of needle operation and the raising of the presser foot, and between the two directions of material feed, for example during a tacking operation, can be provided on the screen.

Stitch Counter

Other displays relating to the oeprator's control of the machine can also be provided. For example, the number of stitches required for any particular seam can be determined with reasonable accuracy since the length of the seam and the number of stitches per unit length are both known, and can be fed into the computer 19. During the sewing operation, the number of stitches 84 sewn on a particular seam can be displayed. Adjacent this display, the number of times the operator stopped the machine 86 until the total number of stitches required for the seam were made can also be displayed.

Furthermore, during the actual operation of the machine, the work pace scale 68 can be replaced by a scale indicating machine speed, for example in revolutions per minute as sensed by the machine tachometer, and the cursor 70 can be moved along the machine speed scale to indicate the actual speed at which the operator runs the machine during the sewing step.

In addition to providing precise measurement of machine implemented work steps, the use of machine sensors and associated graphical displays provides two other significant advantages. First, by being able to distinguish between certain operations within an elemental work step, such as lowering of the presser foot and actuation of the machine needle, this feature enables the observer and the operator to determine where certain unintended delays within the work step may be occurring. Second, by providing an automatic input signal to the measurement system, this feature frees the observer for at least a small, but beneficial, period of time. If no automatic input signals were provided, the observer would be required to concentrate his total attention on the operator's performance 100% of the time that the study is being undertaken. Normally, it is quite difficult for an individual to concentrate with the required accuracy over a substantial length of time, such as an hour, and any lapses in concentration during the period of the study could cause the observer to miss actuation of the snapback switch 36 at the appropriate time, thereby introducing error into the study and loss of credibility in its results. However, by utilizing machine sensors to automatically indicate the initiation and termination of certain elemental work steps, the observer will be afforded brief periods of relaxation during the course of the study, thereby enabling him to more efficiently provide the degree of concentration that is required during the remaining portions of the study.

SYSTEM OPERATION-FEEDBACK

Straight Playback

After the study has been conducted in this manner for a suitable period of time, for example, one hour, the observer is ready to provide immediate feedback to the operator on his performance. In the simplest mode of feedback, the video tape of the operator's activity, including the various elasped time displays, can be played back in a straightforward fashion to enable the operator to review his activities from the observer's standpoint. Even in this simple mode of feedback wherein the video tape recording is simply played back, the time study is afforded a substantial degree of credibility, since the operator will be able to observe the display of the running time indicators simultaneously with his work activities, and will be able to thereby verify and satisfy himself that the various time recordings are in fact accurate.

The system is preferably provided with an edit capability to correct for errors made during the course of the study. For example, if the observer notes during playback that a stopwatch actuation was missed or an interruption was mislabeled, he can depress an edit key on the input keyboard at the appropriate point in time during playback, and then insert the proper information to thereby correct the data stored in the system. In addition, an appropriate indicator can appear on the video screen to note that an error correction was entered at that point.

Preferably, the video tape recorder is provided with a cueing, or addressing mechanism. For example, each time the observer actuates the cycle switch 38 to indicate the completion of a garment, the appropriate encoded signal can be stored in the computer memory and placed on the video tape as an indicator of the point at which operation relating to the subsequent garment begins. With such a capability, during playback of the tape, the operator or observer will be able manually, or under computer control, to go forward or backward on the tape to desired index points to thereby enable the operator to review certain operations. For example, after having gone through the tape or reviewing the numerical printout, if the observor notices that the time for one particular garment is abnormally high, he will be able to go back to the portion of the tape relating to the processing of that garment and review it to determine the cause for any delays.

In this context, the video tape recorder is also preferably provided with slow motion, single frame stop and single frame advance playback capability. With such a feature, the operator will be able to more successfully access and appreciate the information obtained during the study. For example, if the operator has the tendency to delay between lowering the presser foot of the sewing machine and initiating the actuation of the needle, the running time indicator 78 will enable the operator to grasp exactly how much time is being consumed between these two operations, particularly if the playback of the tape is slow enough so that an appreciable amount of time lapses between the disappearance of the presser foot indicator 74 and that of the needle indicator 72. This form of presentation is particularly useful when the system is used as a teaching tool for instructing new operators.

Programmed Feedback

Figure 4:
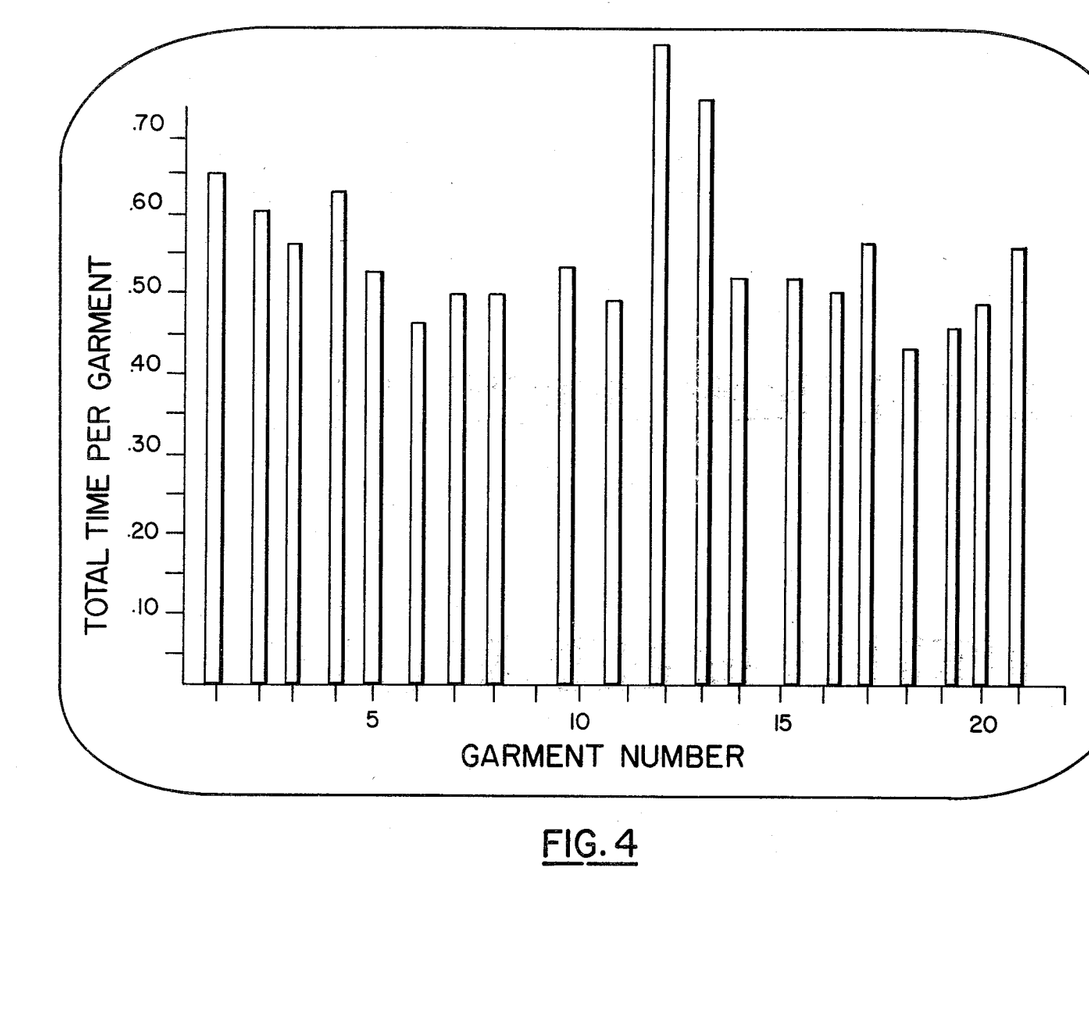
FIGS. 4-8 are illustrations of the video display screen illustrating specific examples of calculated information that can be presented to the operator and the observer in a useful fashion during the feedback mode of operation of the system.

In a second, and more preferred mode of feedback, the playback of the recorded video information is accompanied with a programmed presentation of calculations made from the data obtained during the study. Typically, the operator's initial query after the study has been completed can be in the form of "How did I do?" In response thereto, the observer can show the operator how to operate the computer to obtain the desired feedback presentation. The operator can then cause the computer to generate various graphical displays on the screen that provide an answer to the operator's question. For example, the programmed feedback can begin with a bar chart display of the operator's total time for processing each garment, as illustrated in FIG. 4.

Figure 5:
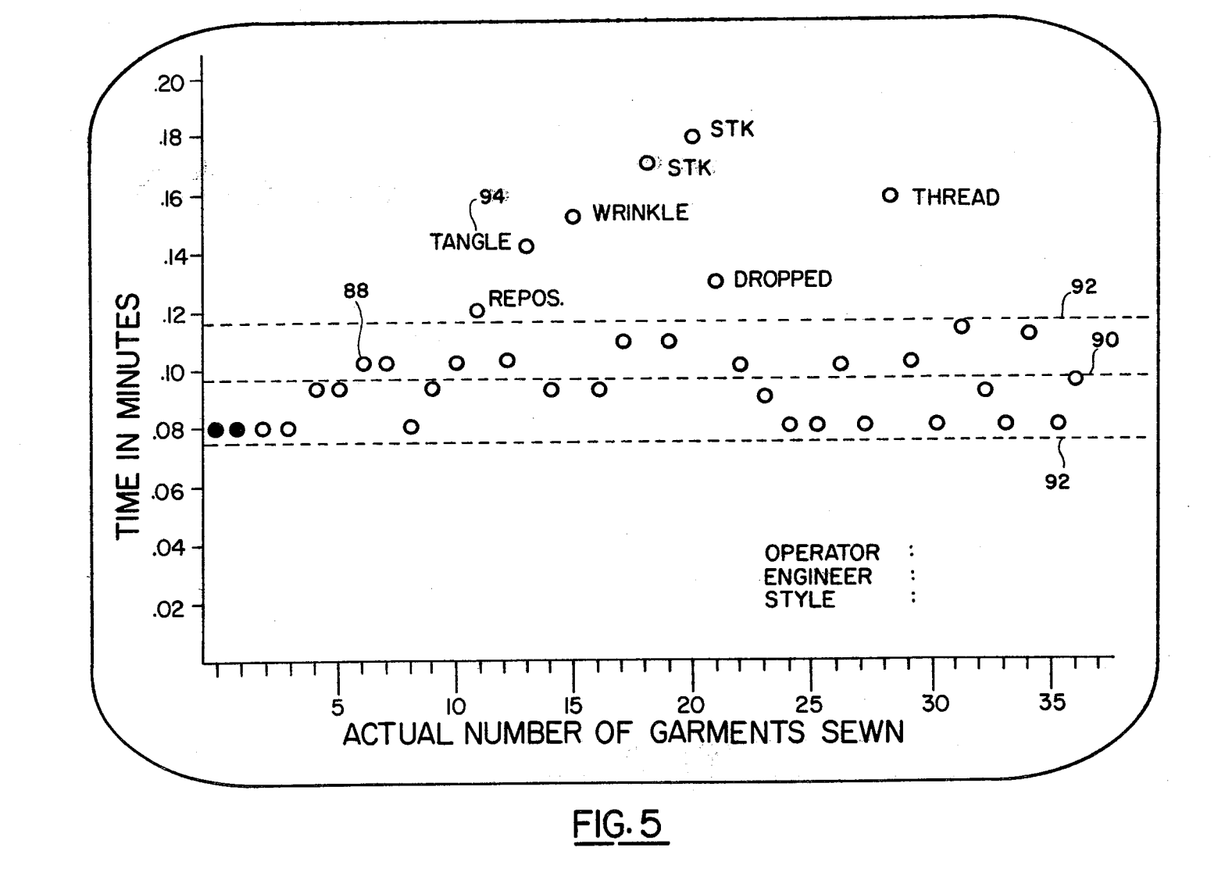

Such a display can be followed up with a display such as that illustrated in FIG. 5, wherein the total time for the processing of each garment is indicated by a suitable mark, such as a dot 88. Based upon the measurement obtained during the study, the computer can calculate and generate a line 90 relating to the average time for the processing of all garments, and standard deviations 92 from the average time. For those times which lie outside of the standard deviation, the computer can search for and display a label 94 relating to an interruption that occurred during the processing of each garment to which the significantly high times relate. If no label is found for a particular garment, the computer can rescan the data to determine if an abrupt change in the work pace was identified, and display the work pace. If neither of these conditions are found, the microprocessor can generate a display to question whether there was a stopwatch control error, or simply place a question mark beside the time dot 88. Once the operator is given information relating to the cause for the abnormal time, he can request that the video tape then proceed to the playback of the portion relating to a particular garment, to thereby review his work methods during the processing of that garment.

Figure 6:
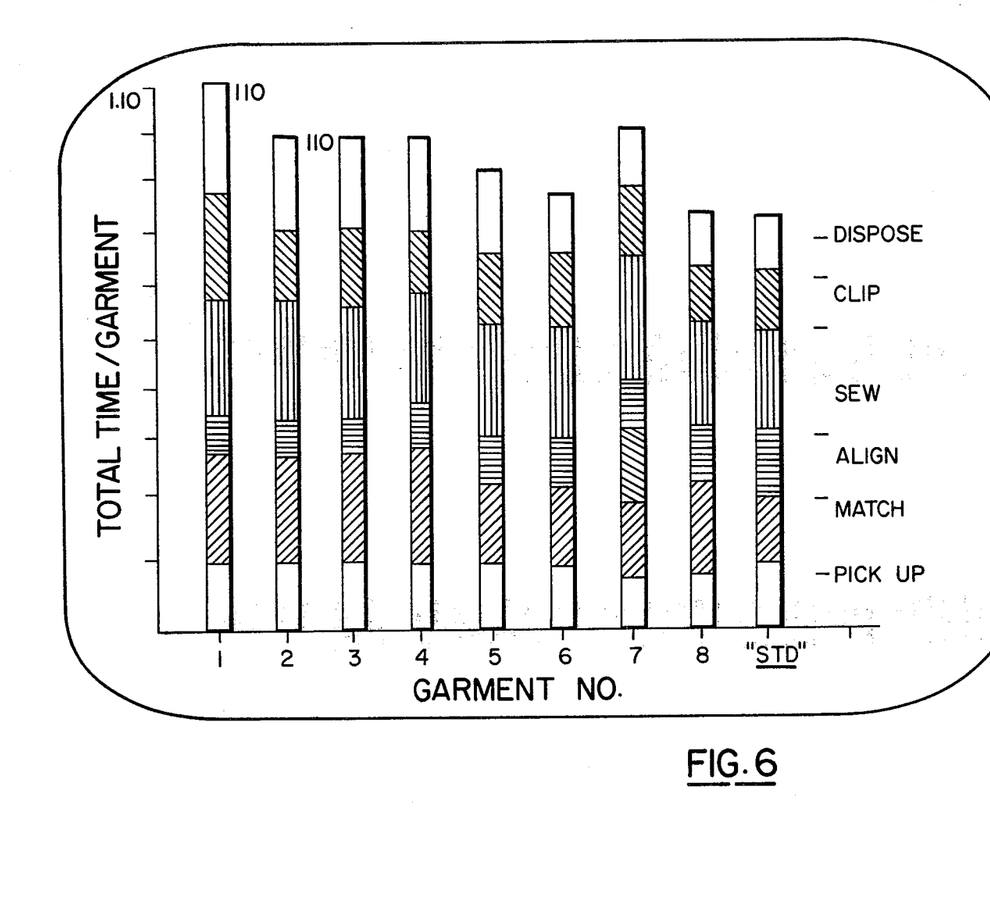

In addition to providing the operator with information relating to the time he took to process the various garments, the programmed feedback of the study information can also provide an indication to the operator of a comparison of his times with those of a standard time determined from information obtained during previous studies. Such a presentation can be provided in the form of a stacked bar chart such as that illustrated in FIG. 6, wherein the operator's time for each elemental step during the processing of each garment are indicated in a stacked bar format, and a stacked bar relating to the standard times appears at one end of the chart for ready comparison by the operator.

Interactive Feedback

Figure 7:
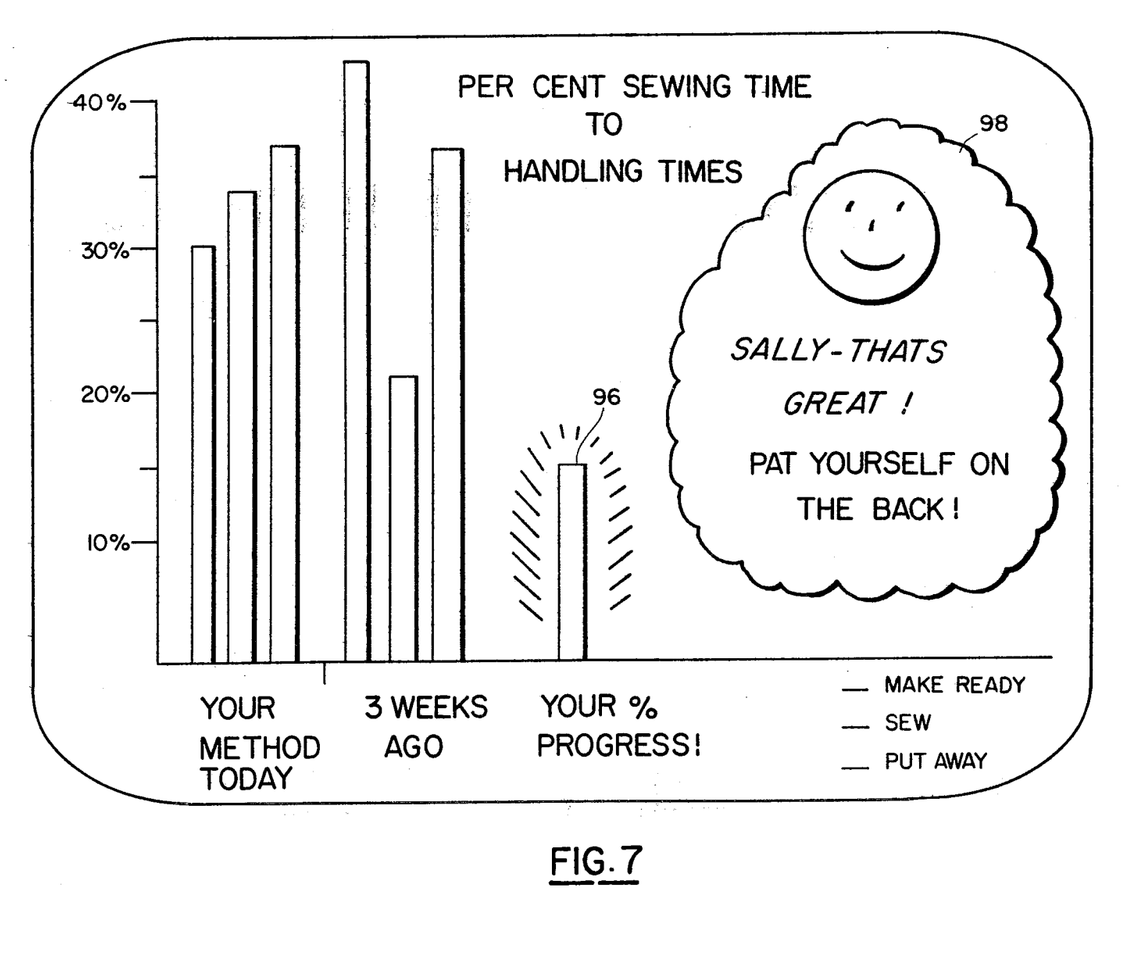
Figure 8:
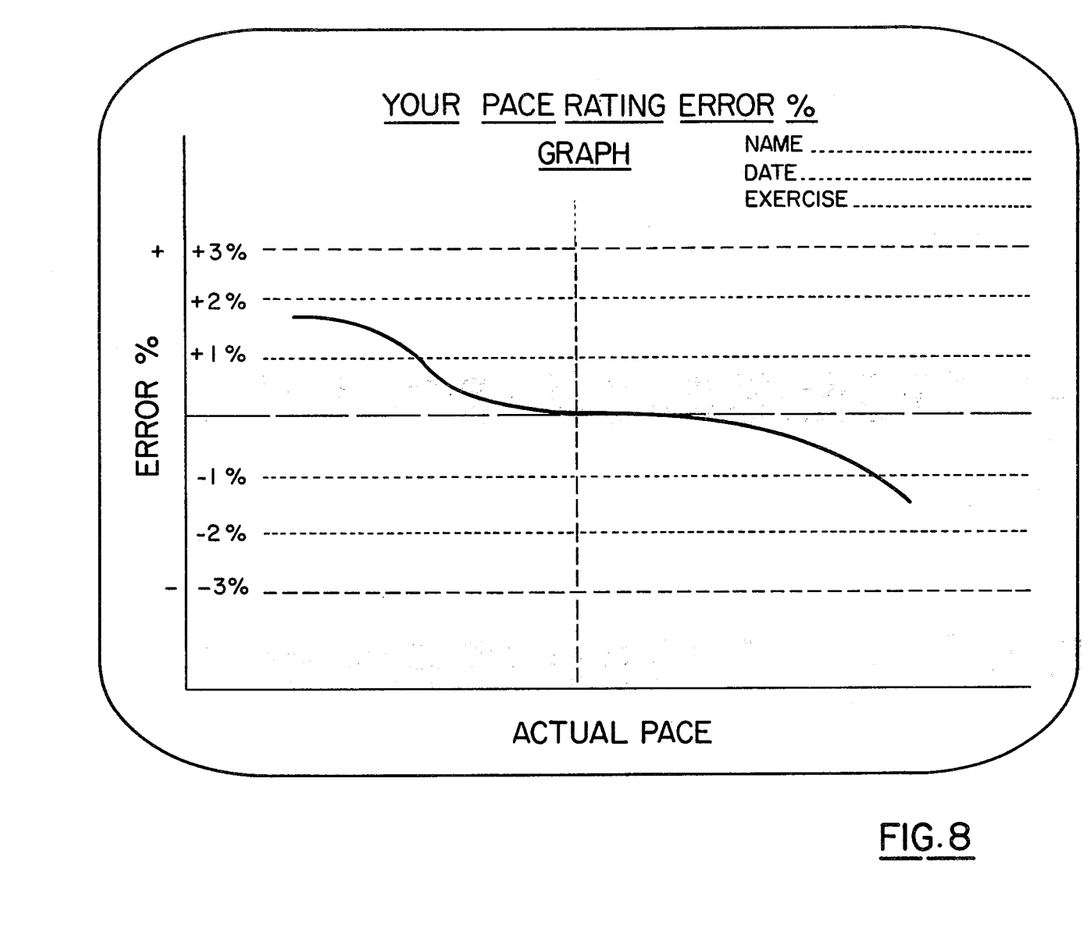

In a third, and most preferred, form of feedback, the programmed presentation of the information obtained during the study is accompanied by interaction between the analyzer system and the operator, with minimal input from the observer. For example, in response to a question such as "How did I do?", from the operator, the observer can tell the operator to ask the computer, and cause a menu type of display to be generated on the screen, which enables the operator to categorize, or further define, his question. For example, the menu display may ask the operator if he wants to know how he did today in comparison with a previous measured performance, standard performance, on a garment by garment basis, where time was lost, etc. If the operator then states that he would like to know how he did today in comparison with a study that was undertaken three weeks previously, a display such as that illustrated in FIG. 7, which provides a bar chart comparison of the operator's measured performance with that taken previously, will be displayed. In the illustration of FIG. 7, the elemental work steps are grouped into three categories: Make ready (preparation), Sewing, and Put away (disposal steps). The bar chart provides a comparison of the percentage of time each of the three categories of work motion occupied during the total garment processing time.

In addition to the actual comparison of percentage times, the display can also include an indication 96 of the operator's progress from the previous measurement, based upon calculations made in the microprocessor. Furthermore, the display showing the calculated results can include a cartoon character 98 or similar such display having a message relating to the calculated results of the study. With such a format, the presentation of information obtained during the study is communicated to the operator on a more personalized basis, thereby involving the operator more intimately in the total time study analysis and giving him a better appreciation for the factors that concern the industrial engineer.

By making the total time study analysis more understandable and comprehensible to the operator, he will be able to play a more significant role in the determination of causes for certain delays in his work methods and calculation of reasonable quotas. For example, after the total study has been played back to the operator in a manner such that he can more readily comprehend the basis for certain calculations, he will be in a much better position to assist the observer in determining what a reasonable productivity quota would be. Thus, instead of concluding the study by having the operator ask "What should my quota be?", the observer is in a much better position to ask the operator what he thinks his quota should be based upon the observed results, and assist him in determining the quota and areas for improvement.

Observer Feedback

In addition to providing useful feedback information to the operator, the microprocessor can also calculate and present feedback information for the observer. For example, if an observer is making an accurate evaluation of an operator's working pace during the study, the actual time for processing a garment multiplied by the working pace for that garment should be the same for each garment. The computer can readily calculate these figures for each garment, and then provide an illustration such as that in FIG. 9 to indicate to the observer whether he is evaluating working pace too high, too low, or both depending on what the pace may be.

Quality Feedback

In addition, the analysis system can be utilized to provide useful information to quality control personnel. For example, the system can provide a breakdown of information relating to each type of interruption encountered during a study. One such type of breakdown may relate to an analysis of thread break interruptions, and categorize them according to sewing machine, operator, thread type, vendor, etc., depending upon the type of information that is entered into the system during the course of each study. A small library of letters can be stored in the microprocessor memory and printed out on appropriate occassions, for delivery by the operator to the proper personnel to alert them to problem areas noted during the course of one or several studies.

The present invention may be embodied in other specific forms without departing from the spirit or essential characteristics thereof. The presently disclosed embodiment is therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A method for communicating information relating to a study of the work method of an operator performing a task composed of one or more elemental steps, comprising the steps of:
    making a video recording of the operator performing the task;
    measuring the elapsed time for performing each elemental step;
    simultaneously making a video recording of the measured elapsed times; and
    instantly replaying the video recording on a video monitor with a plurality of displays of elapsed time relating to the individual elemental steps of the work task upon completion of the work task.

2. The method of claim 1 further including the step of displaying the video recording and elapsed time on the video monitor during the video recording step.

3. The method of claim 1 further including the steps of evaluating the working pace of the operator during the recording step, recording the evaluations, and displaying the evaluated working pace during playback.

4. The method of claim 1 further including the steps of calculating predetermined data from the elapsed time measurements taken during recording, and providing graphical illustrations of the calculated data during playback.

5. The method of claim 1 further including the step of providing cueing signals at predetermined locations on the recording medium to enable the video recording to be selectively addressed during playback.

6. A method for measuring the work habits of an operator performing a work task including sequentially performed elemental steps and subsequently communicating the results of the measurements to the operator, comprising the steps of:
    providing a video recording of the operator performing the task;
    simultaneously displaying the video information being recorded;
    providing a running time indication relating to the elemental step being recorded on the display;
    generating a signal indicative of the completion of one elemental work step and the initiation of a subsequent work step;

stopping the running time indication on the display upon the generation of said signal to thereby indicate elapsed time for the performance of the recorded work step and generating a second running time indication on the display relating to the initiated subsequent work step;

recording the running time displays simultaneously with the video recording; and replaying the recorded information upon completion of the work task.

7. The method of claim 6 further including the steps of generating a signal upon the occurrence of an interruption;

temporarily halting the running time indication relating to the elemental work step and generating a running time indication relating to the interruption;

generating a second signal upon termination of the interruption; and stopping the running time indication relating to the interruption and resuming the running time indication relating to the performance of the elemental work step upon the generation of said second signal.

8. The method of claim 7 further including the step of assigning and displaying a label relating to the interruption.

9. The method of claim 8 wherein the assignment of the label is provided by an audible input signal.

10. The method of claim 6 wherein said signal is generated automatically upon detection of operation of a machine element.

11. The method of claim 10 further including the step of generating an indication on the display relating to the machine element operation being detected.

12. The method of claim 11 wherein said indication comprises a graphical illustration of a machine element.

13. The method of claim 10 further including the step of detecting the operation of two different machine functions, and providing a running time display of the elapsed time between initiation of actuation of the two functions.

14. The method of claim 6 further including the step of displaying and recording an estimation of the operator's working pace during performance of the task.

15. The method of claim 6 further including the steps of generating a signal indicating completion of the last elemental step in the work task, and providing a display of the total elapsed time for performance of the task.

16. A video system for measuring, and use in analyzing, the performance of an operator carrying out a series of sequential work steps, comprising:

a camera for generating a video signal related to the operator's performance;

a monitor for displaying said video signal;

means for generating a display of running time on said monitor;

means for generating a label display on said monitor relating to a work step being performed;

means for generating a signal upon completion of one work step and initiation of the next subsequent work step;

control means responsive to said signal for stopping the running time display to indicate elapsed time, and for causing a second running time display and second label to be generated on said monitor; and a recorder for recording the information on said monitor.

17. The system of claim 16 further including means for providing an input signal relating to an observer's instantaneous estimation of the operator's performance, and for displaying the estimation on said monitor.

18. The system of claim 16 further including means for generating a signal indicating the interruption of a work step, said control means being responsive to said interruption signal to temporarily stop the display of running time and cause a display relating to elapsed time for the interruption to be generated.

19. The system of claim 18 further including means for providing an audible input signal relating to the interruption to said control means, said control means being responsive to said audible input signal to cause a display of a label for the interruption to be generated.

* * * * *